No. 718,201. PATENTED JAN. 13, 1903.
R. C. GOSSETT.
SAWING MACHINE.
APPLICATION FILED APR. 25, 1902.
NO MODEL. 2 SHEETS—SHEET 1.
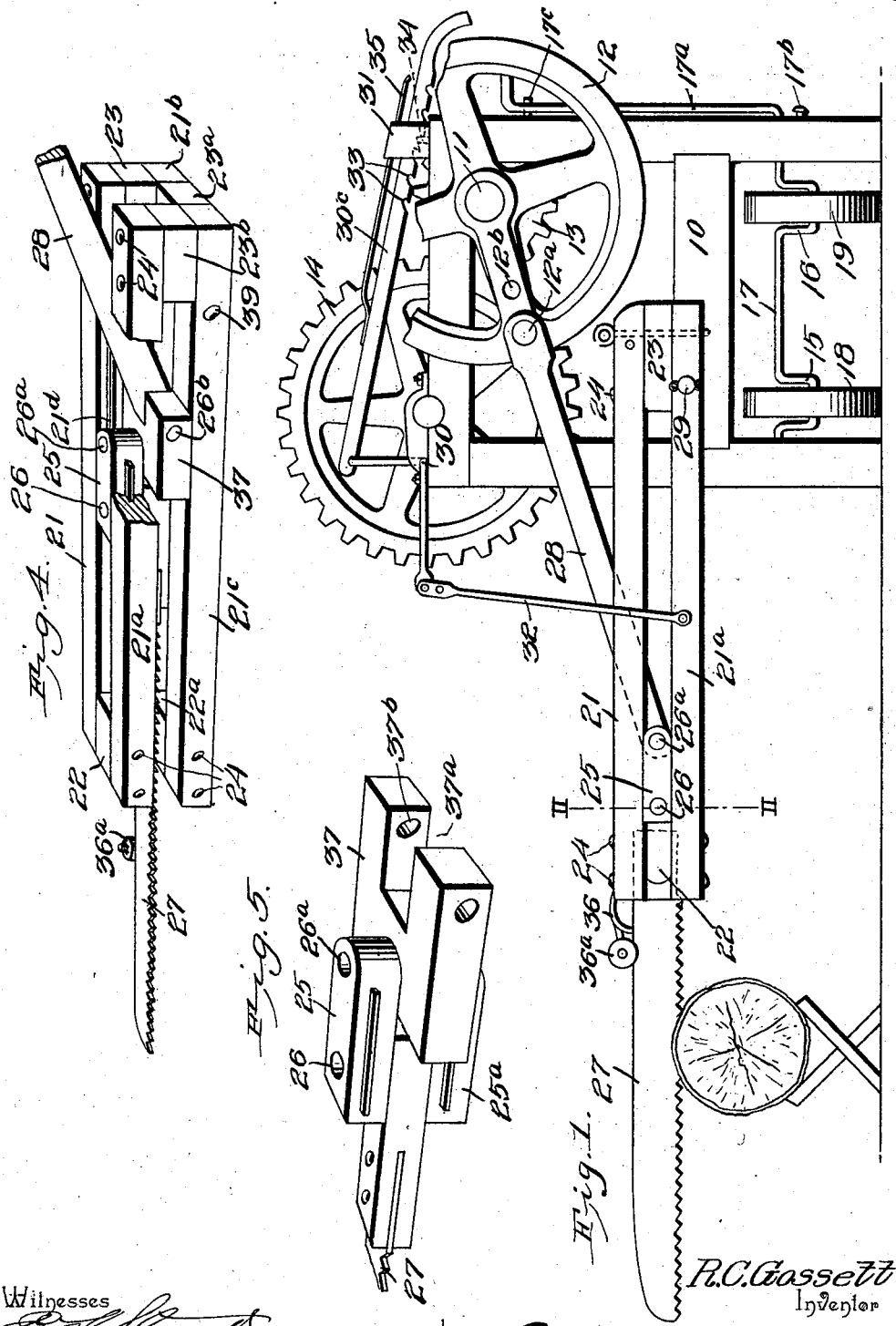
Witnesses
R. C. Gossett
Inventor
by
Attorneys

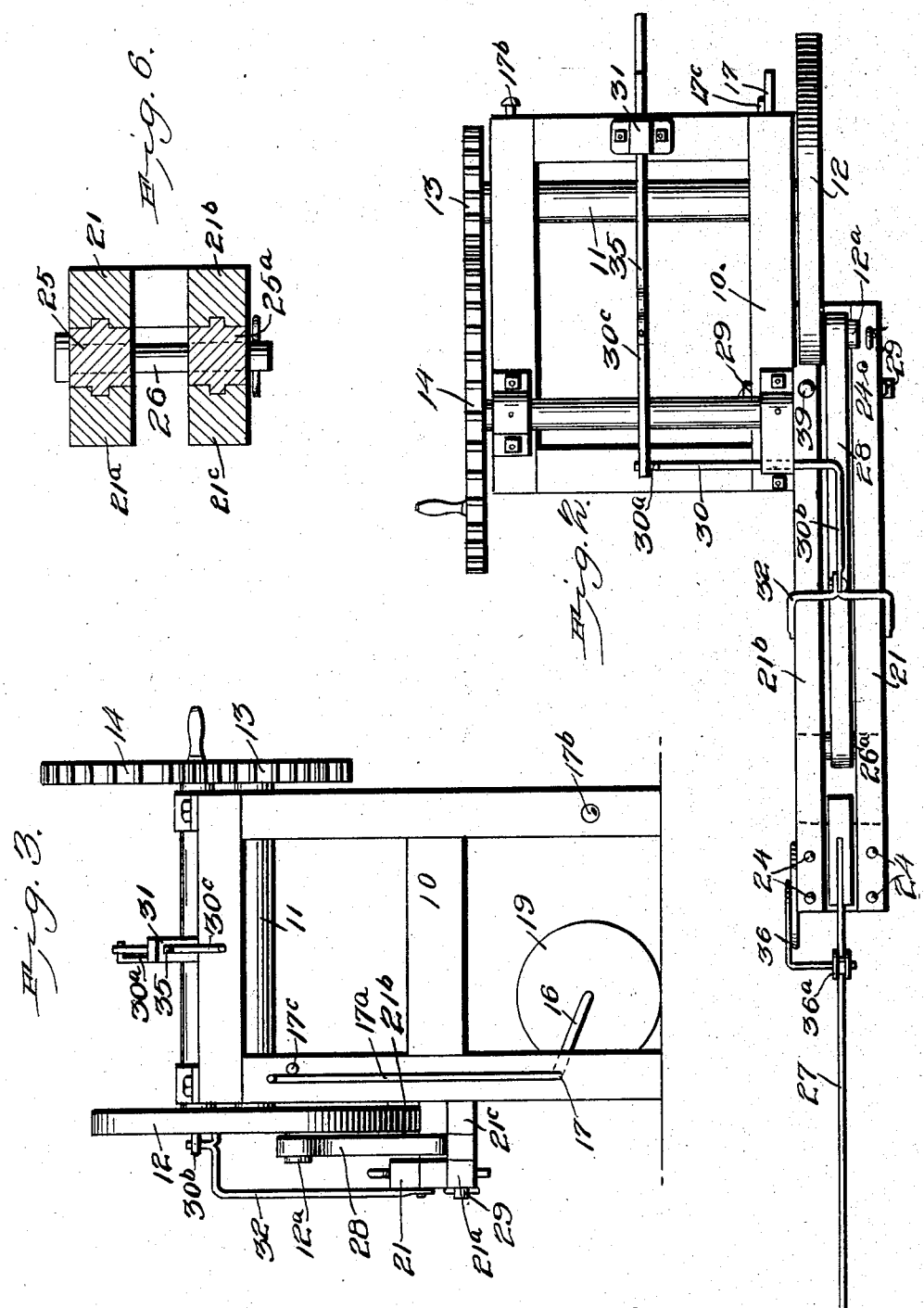

UNITED STATES PATENT OFFICE.

RICHARD CLARENCE GOSSETT, OF MOSCOW, IDAHO.

SAWING-MACHINE.

SPECIFICATION forming part of Letters Patent No. 718,201, dated January 13, 1903.

Application filed April 25, 1902. Serial No. 104,670. (No model.)

*To all whom it may concern:*

Be it known that I, RICHARD CLARENCE GOSSETT, a citizen of the United States, residing at Moscow, in the county of Latah and State of Idaho, have invented a new and useful Sawing-Machine, of which the following is a specification.

This invention relates to that class of machines known as "drag-saws," employed generally for the purpose of sawing down standing timber and also adapted to saw the timber into logs or "billets;" and the invention consists in certain novel features of construction, as hereinafter shown and described, and specified in the claims.

In the drawings illustrative of the invention, Figure 1 is a side elevation. Fig. 2 is a plan view. Fig. 3 is a rear elevation. Fig. 4 is a detail perspective view of the saw-frame with the saw arranged to operate horizontally or in position to cut standing timber and the like. Fig. 5 is an enlarged detached perspective view of the main cross-head with a portion of the saw and the supplemental cross-head. Fig. 6 is a cross-section on the line II of Fig. 1.

The framework is represented at 10, of the usual timber construction, and provided at its upper part with a main driver-shaft 11, having a face-plate 12, connected to be driven by gearing 13 and 14, as shown, whereby an increased speed may be imparted to the driver-shaft.

Supported upon cranks 15 and 16 in a shaft 17 near the lower part of the framework are two bearing-wheels 18 19, adapted when the cranks are depressed to project below the lower line of the framework and afford means for assisting in the transportation of the device. One end of shaft 17 is provided with an operating arm or lever $17^a$, by which the shaft may be actuated to depress the wheels, and which is adapted to engage a stop $17^b$ upon the frame 10 when in its lowermost position to maintain the arm and wheels in their depressed position as long as required, and a a similar stop $17^c$ will also be provided to hold the arm and wheels in their elevated position when not required.

The saw-frame consists of four spaced bars 21, $21^a$, $21^b$, and $21^c$, the bars 21 $21^a$ forming one side of the frame and the bars $21^b$ $21^c$ forming the other side of the frame.

The bars 21 $21^a$ are connected at their forward ends by a block 22, and the bars $21^b$ $21^c$ are similarly connected by a corresponding block $22^a$. At their inner ends the bars are similarly connected by blocks 23, $23^a$, and $23^b$, as shown.

The block 23 is removable from between the bars 21 and $21^a$ and adapted to be inserted between the bars 21 and $21^b$ at the rear ends, as shown in Fig. 4, when the machine is adapted to saw standing timber and the like, as hereinafter explained.

The bars and blocks are all united by bolts 24, as shown, so as to be readily disconnected when required.

A cross-head 25 is disposed slidably between the bars 21 and $21^a$, and a similar cross-head $25^a$ is disposed between the bars $21^b$ and $21^c$, each cross-head member having longitudinal ribs engaging corresponding horizontal groove or guide-channel $21^d$ in the contiguous faces of the bars 21 $21^a$ and $21^b$ $21^c$, respectively, as shown.

The cross-head members are connected by transverse pins 26 $26^a$ near their ends, as shown, the pin 26 supporting the saw 27 and the pin $26^a$ connected to one end of a connecting-rod 28, the other end of the latter being connected to the crank-pin $12^a$ of the face-plate 12. By this means the revolution of the shaft 11 will cause the saw to be reciprocated in the saw-frame.

The saw-frame is supported at its rear end upon a stud-shaft 29, extending from the frame 10, as shown.

Supported upon the frame 10 is a rock-shaft 30, having arms $30^a$ and $30^b$ extending from its ends, the arm $30^a$ connected to an operating-rod $30^c$, passing rearwardly and engaged by a keeper 31 upon the frame 10, and the arm $30^b$ connected to a yoke-frame 32, embracing the saw-frame and pivotally connected to the bars $21^a$ and $21^c$, as shown.

The rod $30^c$ is provided with a series of spaced notches 33, adapted to engage a stop 34 in the frame 10 and maintained in normal engagement therewith by a spring 35. By this means the rod $30^c$ may be adjusted to any extent to oscillate the shaft 30 to elevate and depress the forward end of the saw-frame to regulate the action of the saw and adapt it to the work required.

A spring 36 will be connected to the saw-frame and carrying a grooved roller 36ª, adapted to engage the back of the saw and serve as a tension means to "feed" the saw and maintain it in operative position. When thus arranged, the saw may be employed in sawing logs into billets or in sawing cut timber into logs or for any other purpose wherein a vertically-acting saw is required and which can be readily adapted to any-sized timber or log.

The face-plate 12 will be provided with extra holes 12ᵇ at varying distances from the shaft 11 and adapted to receive the crank-pin 12ª, so that the stroke of the saw may be varied, if required.

A supplemental cross-head 37 will be provided to enable the connection to be made between the cross-head members 25 and 25ª and the connecting-rod 28 when the machine is to be adapted to operate on standing timber or the like, this supplemental cross-head being formed with a cavity 37ª, adapted to embrace the connecting-rod 28 and having perforations 37ᵇ to receive a supplemental pin 26ᵇ, while the body of the supplemental head is perforated reversely to the perforations 37ᵇ and adapted to engage the cross-head members 25 25ª and be secured therein by the pin 26ª, as shown in Fig. 5.

To adapt the machine to operate horizontally or to saw down standing timber, the saw-frame is removed from the stud-shaft and the yoke-frame 32 and the block 23 removed and inserted between the bars 21 21ᵇ, as shown in Fig. 4, the bars having suitable perforations for the bolts, as shown.

The supplemental cross-head 37 is then connected in the frame, as above described, and the frame turned over on its side and the connecting-rod 28 connected to the pin 26ᵇ and the frame connected to the stud-shaft 21ᵈ by means of a perforation 39 through the bars 21ᵇ and 21ᶜ, as indicated, and the yoke-frame 32 connected to the bars 21ᶜ and 21ᵇ. This places the frame in the same relations to the operative mechanism as before, but with the saw reversed or adapted to act horizontally.

The supplemental pin 26ᵇ may be carried in the supplemental aperture 39 when not in use. By this means a very convenient, durable, and cheaply-constructed machine is produced, having few parts, and therefore not liable to get out of order or become otherwise disarranged.

The machine may be made in any size desired and may be modified and changed in minor details without affecting the spirit of the invention or sacrificing any of its advantages.

Having thus described my invention, what I claim is—

1. In a sawing-machine, the combination with a framework comprising four spaced timbers, of a double saw-carrying cross-head composed of members separably connected, the member constituting the one cross-head being secured between, and serving to space the members constituting the other cross-head.

2. In a sawing-machine, a guiding-frame composed of four spaced timbers, in combination with a composite saw-carrying cross-head comprising members disposed at right angles to each other and engaging the slots at right angles to each other in said guiding-frame.

3. In a sawing-machine, a saw-carrying cross-head comprising a pair of members spaced by the saw-head and connected by a bolt passing through said members and saw, said members being adapted for the reception between them at their free ends, of an auxiliary cross-head disposed at right angles thereto and adapted to be secured in position by the bolt normally serving for the securement of the operating-pitman.

4. In a sawing-machine, the combination with a guiding-frame, of a saw-carrying cross-head composed of two members spaced by the saw-head, and an auxiliary cross-head engaging between the members composing the cross-head proper, at right angles thereto and having means for connection with the operating-pitman.

5. In a sawing-machine, the combination of the main frame having a stud-shaft, a guiding-frame detachably engaging said stud-shaft and having openings, at right angles to each other, for engaging the same, and means detachably connected with said frame for adjusting the same upon the stud-shaft as a fulcrum, whereby the said frame may be mounted and receive adjustment in two different positions at right angles to each other.

6. In a sawing-machine, a supporting-framework, a saw connected to said framework, means carried by said framework for operating said saw, a shaft having cranks and journaled upon said framework, bearing-wheels carried by said cranks, a lever-arm disposed to operate said shaft, whereby said wheels are caused to be forcibly moved into position below the line of said framework, and a stop adapted to maintain said lever-arm in its depressed position, substantially as described.

In testimony that I claim the foregoing as my own I have hereto affixed my signature in the presence of two witnesses.

RICHARD CLARENCE GOSSETT.

Witnesses:
W. F. EDMONDSON,
F. H. GOSSETT.